(12) United States Patent
Oosawa

(10) Patent No.: US 6,882,744 B2
(45) Date of Patent: Apr. 19, 2005

(54) METHOD OF REGISTERING IMAGES

(75) Inventor: Akira Oosawa, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 756 days.

(21) Appl. No.: 09/955,053

(22) Filed: Sep. 19, 2001

(65) Prior Publication Data
US 2002/0048393 A1 Apr. 25, 2002

(30) Foreign Application Priority Data
Sep. 19, 2000 (JP) ........................ 2000-283568

(51) Int. Cl.$^7$ ............................................. G06K 9/00
(52) U.S. Cl. ............................ 382/132; 382/294
(58) Field of Search ......................... 382/128, 129, 382/130, 131, 132, 133, 134, 151, 154, 293, 294; 128/922

(56) References Cited

U.S. PATENT DOCUMENTS

| | | | | |
|---|---|---|---|---|
| 4,685,146 A | * | 8/1987 | Fenster et al. | 382/294 |
| 5,359,513 A | * | 10/1994 | Kano et al. | 382/128 |
| 5,483,606 A | * | 1/1996 | Denber | 382/294 |
| 5,982,953 A | * | 11/1999 | Yanagita et al. | 382/294 |
| 6,625,331 B1 | * | 9/2003 | Imaizumi et al. | 382/294 |

FOREIGN PATENT DOCUMENTS

| | | | | |
|---|---|---|---|---|
| JP | 7-37074 | 2/1995 | | G06T/1/00 |
| JP | 8-335721 | 12/1996 | | H01L/35/14 |

* cited by examiner

Primary Examiner—Bhavesh M. Mehta
Assistant Examiner—Abolfazl Tabatabai
(74) Attorney, Agent, or Firm—Sughrue Mion, PLLC

(57) ABSTRACT

A method of registering two images is disclosed. To register a first image P1 with respect to a second image P2, a number of small regions (search ROIs) are set in first image P1, and a number of small regions (template ROIs) are also set in second image P2. A template matching is performed between those corresponding small regions, and a shift amount for (the central pixel of) each search ROI is determined. By taking each search ROI as a central search ROI, the shift amount for the central search ROI is bound with the respective shift amounts for the neighboring search ROIs by spring binding forces. The shift amount for the central search ROI is corrected such that the binding forces are balanced.

11 Claims, 6 Drawing Sheets

F I G. 3
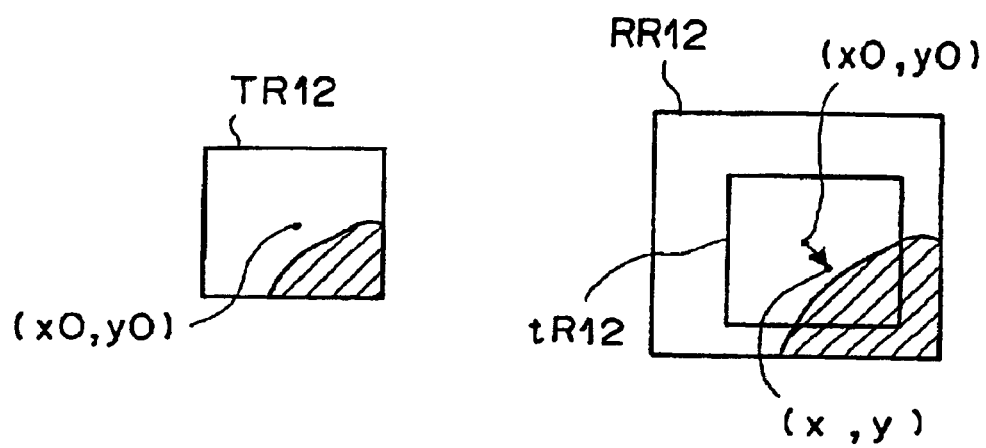

METHOD OF REGISTERING IMAGES

BACKGROUND OF THE INVENTION

1. Field of the Invention

This invention relates to a method of registering images and particularly to an improvement in the method of registering two images.

2. Description of the Prior Art

Reading and comparing two or more images of an identical object is often carried out in various fields to determine differences between the images and examine the object based on the differences.

For example, in the manufacture of industrial products, an image taken of a product when it is new and another image of the same product after durability tests are read and compared to localize an area or areas with great differences. This allows the manufacturer to find out which portion of the product should be improved in terms of durability. In medical applications, a plurality of temporally sequential radiographs of a patient's lesion area are comparison-read by a doctor to allow the doctor to monitor the progress of the disease or its recovery for determining future course of treatment.

These types of comparison-reading of two or more images, which are performed on a daily basis in various fields, often require the images to be displayed on an image display device. This involves the conversion of the images into density or luminance signals which are output to the display device or to a printer, the latter outputting the signals onto a medium such as a film.

Those two or more images are generally placed side by side for comparison reading purposes. However, what the reader is most concerned about is the difference between the images, but it is difficult for him or her to find such difference when the images are simply placed one next to the other. This difficulty becomes all the more pronounced the smaller the difference is.

In order to overcome this problem and improve the comparison reading performance, an inter-image calculation such as subtraction processing can be performed between corresponding pixels of two or more images to be comparison-read, so that the difference can be extracted and enhanced. Such extraction and enhancement of only the difference between images allows the image reader to visually recognize the inter-image difference, thereby preventing a failure to notice the progressing or recovering of the lesion.

Such inter-image calculation requires that the two images to be compared are registered with accurately matched positional characteristics. If there is a misregistration, artifacts of structures in the images can be produced by the inter-image calculations between the corresponding pixels.

Another consideration that has to be taken into account is the fact that the two images to be compared are not always those taken at the same time but in many cases those that were taken at two different points in time. Accordingly, the images often contain misregistration caused particularly by the movement of the object between the respective points in time or other errors. Such positional misalignment must be corrected prior to the inter-image calculations.

The misregistration can be corrected in various ways. For example, at least one of the images can be subjected to a linear transformation (parallel shifting, rotation, enlargement/reduction) such as an affine transformation. In another instance, a number of small template regions can be set in one of the images, and larger search regions can be set in the other image, each of the latter regions corresponding to each template region. In each pair of the template regions and the corresponding search regions, a partial region is located in the search region where the template region substantially matches the image (template matching on a small region basis). Based on the relative corresponding positional relationship between each template region in one image and each partial region in the other image, a relative shift amount is determined between each pair of corresponding regions (between the template regions and the corresponding partial regions). Then, registration can be achieved by shifting either the template regions or the partial regions by the respective shift amounts.

Although such linear transformation techniques can achieve overall registration, they cannot provide such a precise registration as is needed in the pixel-by-pixel calculations in the subtraction processing, for example. Also, the registration technique using the template matching on a small region basis may result in the structures (such as the ribs in a chest radiograph) in the image after registration being unnaturally deformed. This is caused by the effect of noise and the like introduced in the images by the independent shifting of the respective small regions, which might result in part of the small regions being shifted in or towards a greatly different direction or position than the shift direction or position of other small regions.

To counter this problem, Japanese Unexamined Patent Publication Nos. 7(1995)-37074 and 8(1996) -335721, for example, propose image registration methods whereby a number of small template regions are set in at least one of the two images of the same object for comparison. In the other image, larger search regions which respectively correspond to the template regions are set. In each pair of the corresponding template regions and search regions, a partial region is determined in the search region where the template region and the image substantially correspond. Based on the relative corresponding positional relationship between the template region in one image and the partial region in the other image, a relative shift amount for each pair of regions (between the template regions and the corresponding small regions) is determined. Thereafter, a nonlinear warping transformation processing (by, for example, a curve fitting technique using a second-order polynomial) is performed on one of the images such that the both regions substantially correspond to each other. This method allows the abrupt shift amount caused in part of the regions due to noise and the like to be absorbed and smoothed, so that the above-mentioned problem can be prevented and a highly precise registration can be achieved.

However, the proposed registration methods can still result in some of the regions having unsatisfactory registration. Such improper small regions may be manually registered by the doctor looking at the displayed images for better registration. However, since the above-explained methods smooth the shift amounts based on the shift amounts of all of the small regions, a correction of the shift amounts for part of the small regions can end up making it necessary to re-calculate the shift amounts for all of the small regions, which takes a long time.

SUMMARY OF THE INVENTION

An object of the present invention is to provide a method of registering images whereby two images to be compared can be precisely registered and the calculation time can be minimized.

In accordance with the image registration method of the invention, shift amounts are determined for the respective corresponding small regions of the two images to be compared. Each small region as a central region is bound to a plurality of small surrounding regions with binding forces which depend on the respective shift amounts. Based on those binding forces, a new shift amount is then determined so as to balance with the shift amounts of the surrounding small regions, and registration is performed on a small region basis. The invention thus enables the smoothing effect to be obtained by a simple calculation process and can maintain a highly accurate registration.

More specifically, the method of registering two images to be compared according to the invention comprises the steps of: setting a number of corresponding small regions in the two images; determining corresponding positional relationships between the corresponding small regions in the two images; determining, based on the respective corresponding positional relationships, relative shift amounts between corresponding small regions for registration; binding each small region as a central region with a plurality of surrounding small regions with binding forces corresponding to the shift amount for the central region and the shift amounts for the surrounding small regions; determining a new relative shift amount for each central region depending on the binding forces; and relatively shifting the corresponding small regions in accordance with the new relative shift amount for each central region.

The images to which the present invention is to be applied may be medical radiographs and are preferably temporally sequential images of the same object taken at different points in time. This is because those images tend to be relatively more prone to misregistration and at the same time demand correction of such misregistration. The object may be anything from animals, plants, industrial products, terrestrial features and the heavenly bodies to landscape, as well as human bodies.

It is preferable that the two images to be compared are adapted for the inter-image calculations that require a high registration accuracy. Such inter-image calculations preferably comprise a subtraction processing using corresponding pixels of image information representing the two images. In this case, the subtraction may be a simple one or one with weighting. Inter-image calculation images obtained by the subtraction processing are generally called subtraction images. The subtraction image include: an energy subtraction image obtained based on (through simple subtraction or weighted subtraction of) two original images (a high-energy image (normal radiograph) and a low-energy image (an image taken with radiation of restrained energy)) with different energy distributions that are taken at substantially the same time; a temporal subtraction image obtained based on two original images taken at different points in time; and a digital subtraction angiography (DSA) image obtained based on two original images of a blood vessel which are taken before and after the injection of a contrast agent.

Furthermore, the images are desirably ones taken at different points in time with a tendency for misregistration, and are preferably radiographs for medical purposes.

It is further preferable that the multiple small regions are set in the two images in such a manner as to cover the respective images in their entirety. However, the small regions may be set in only the regions of interest (ROI) that are to be the subject of inter-image calculations such as the subtraction processing. This is because it is enough that registration is achieved in the ROIs in order to clarify the difference in the ROIs.

The corresponding positional relationship refers to such a positional relationship between corresponding small regions in different images that the degree of correspondence between the images in those regions becomes highest. The corresponding positional relationship is expressed by the coordinates of the center of each of the corresponding small regions, for example.

The corresponding positional relationship is preferably determined by a template matching between the corresponding small regions, for example. In this case, the small regions in one of the images are set as templates, and the small regions in the other image are set as search regions which are larger than the templates. By moving the template in the search region, an image portion is searched that provides a highest degree of correspondence with the image in the template.

The relative shift amount for registration between the corresponding small regions refers to the amount of shifting necessary for shifting a small region in one image to a corresponding position of a corresponding small region in the other image, or to the amount of shifting necessary for shifting a small region in the other image to a corresponding position of a corresponding small region in one image. This relative shift amount is uniquely determined by the above-mentioned corresponding positional relationship.

The binding of each small region as a central region to a plurality of surrounding small regions refers to the following technique. First, shift amounts for the respective small regions in one or the other image are determined with reference to the other or one image. A particular small region in one of the images to be shifted is focused and designated as the central region. The central region is bound with the small regions surrounding the central region (there should be eight such small regions surrounding the central region directly, i.e. not via another region, when the small regions are laid out in a matrix; there should be six such small regions when the small regions are laid out in a staggered, hound's-tooth manner) with a certain binding force. This binding is performed independently for each and every region to be taken as the particular small region.

To bind the central region with each of the surrounding small regions with a binding force which depends on the shift amount for the central region and the shift amount for each of the surrounding region means that the central region is bound with a binding force which is determined by the results of calculations such as the difference of the respective shifting amounts for the central region and the small region. The binding force includes the elastic force of a spring, for example, where the difference in the shift amount between the central region and each of the surrounding, small regions is assumed to be the "amount of displacement". The binding force may also include such an attraction force as the Coulomb's force where the respective shift amounts for the central region and the surrounding small regions are assumed to be "electric charges" or "magnetic charges". In particular, it is preferable that the binding force is a linearly proportional elastic force for reasons of calculation acceleration.

The modulus of elasticity of the elastic force is preferably variable for each of the surrounding small regions, so that it can be varied depending, for example, on the distance between the central region and each of the surrounding small regions.

The new relative shift amount for each central region is determined depending on the binding force in the following manner. When the central region is bound with the surrounding small regions by binding forces comprising springs, for example, the shift amount by which the central region is pulled back by the binding forces (elastic forces) is subtracted from the original shift amount (which is calculated based on the corresponding positional relationship), thereby obtaining the new shift amount. The same process applies when such gravitational force as the Coulomb's force is used instead of the elastic force.

As the new relative shift amount is determined for each small region, there will arise further restoring force or gravitational force due to the binding forces. Therefore, it is preferable that this operation be repeated on the basis of the new shift amount to find a further new shift amount. By repeating the operation until the sum of the binding forces drops below a predetermined value, for example, there can be advantageously obtained a better smoothing effect.

Thus, in accordance with the image registration method of the invention, a number of small corresponding regions are set in the two images to be registered, and a positional relationship is determined for each pair of the corresponding small regions in the two images. Based on the corresponding positional relationship, a relative shift amount is determined for the registration of each pair of corresponding small regions. Further, each small region is designated as a central region, and the central region is bound with the surrounding small regions with binding forces which depend on the shift amount for the central region and the shift amount for each of the surrounding small regions. Thus, the shift amount for the central region can be smoothed by the springs based on the shift amounts for the surrounding small regions. Each of the corresponding small regions is thereafter relatively shifted in accordance with the new relative shift amount obtained by the above smoothing operation. Thus, the invention enables the two images to be registered with accurately matched positional characteristics by a relatively simple calculation process.

According to the prior art, it was necessary to re-calculate the shift amounts for the entire small regions, which takes a long time, just because the shift amounts for part of the small regions were corrected. In accordance with the present invention, however, it is only necessary to correct the shift amounts for the central region and the surrounding small regions, thereby greatly reducing the time required for the re-calculation of the shift amounts.

BRIEF DESCRIPTION OF THE DRAWINGS

FIG. 3 shows drawings for the explanation of the template matching technique.

DESCRIPTION OF THE PREFERRED EMBODIMENTS

Figure 1:
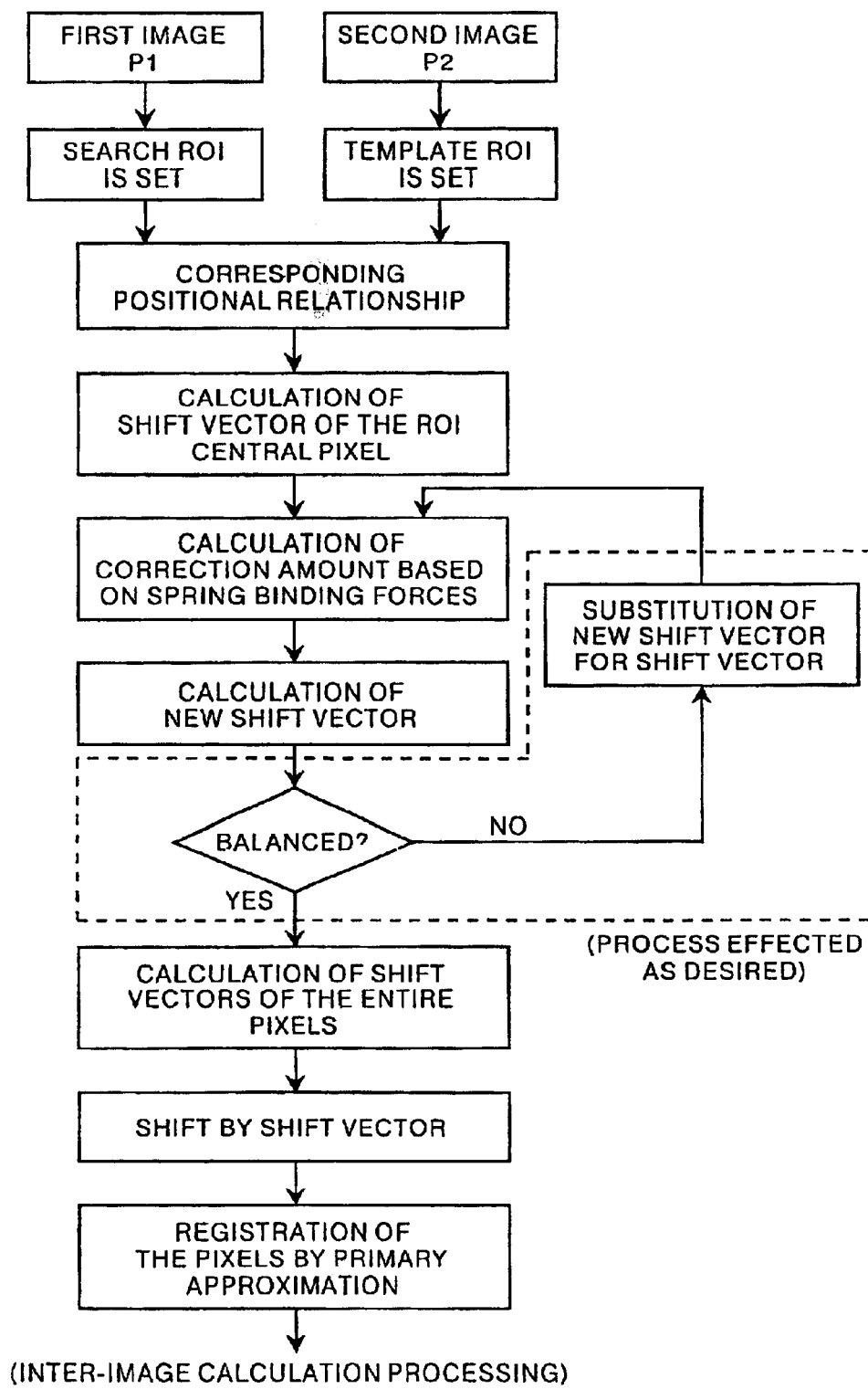
FIG. 1 is a flowchart of the processing performed in an embodiment of the image registration method according to the invention.
Figure 2:
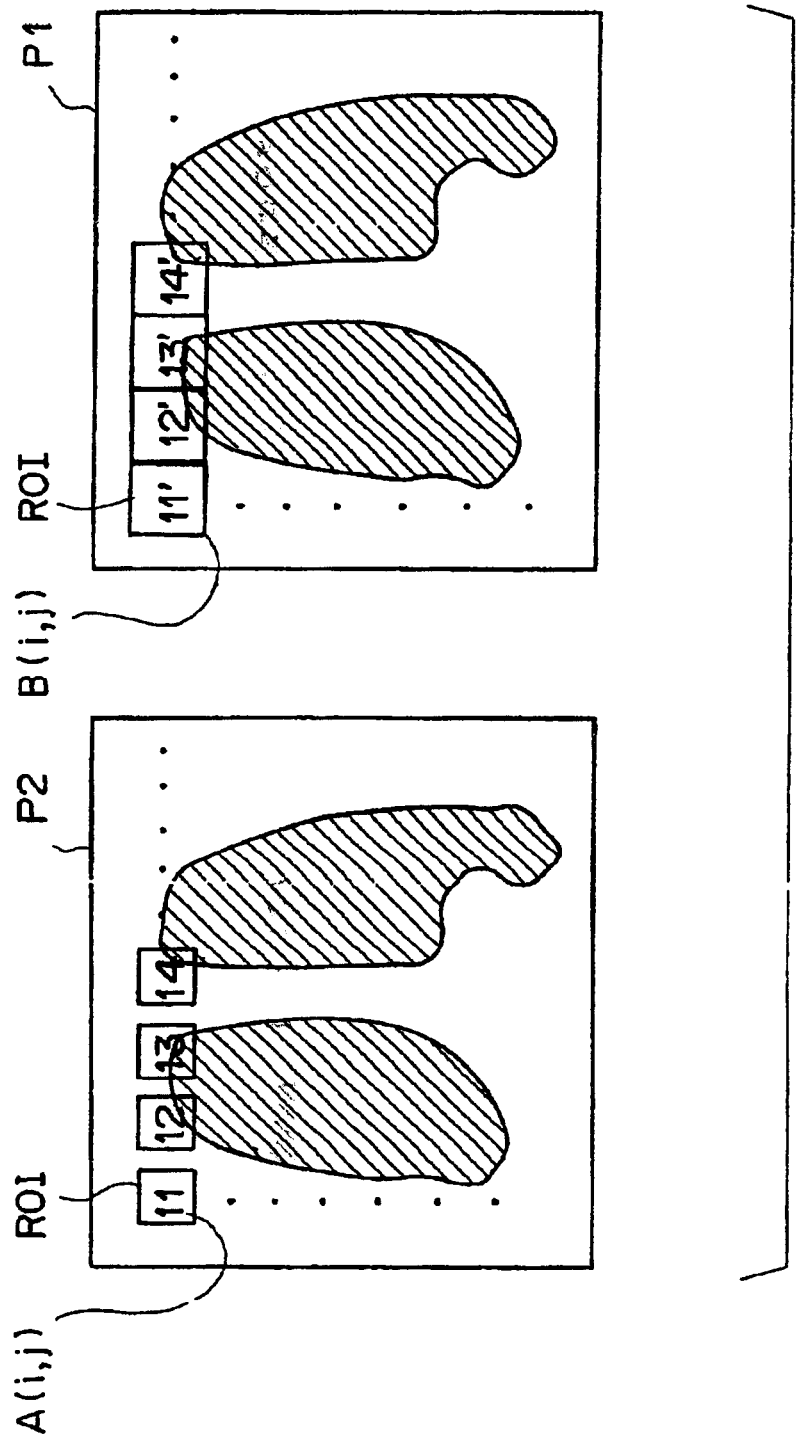
FIG. 2 shows two images P1 and P2 which are to be registered according to the embodiment of FIG. 1.

A preferred embodiment of the registration method according to the present invention will be hereunder described by referring to the attached drawings. FIG. 1 shows the flowchart of an embodiment of the invention. The two images P1 and P2 shown in FIG. 2 which are to be registered according to the embodiment are chest images (radiographs) of the same patient and were taken at different points in time. A first image P1 was taken at a later time than a second image P2 and is also called a previous image. A second image P2 is newer than first image P1 and is also called a current image. The sizes of the two images P1 and P2 each are 1760 pixels long (L) by 1760 pixels wide (w) (5 pixels/mm).

When these two images P1 and P2 are comparison—read by a doctor, for example, he or she usually does so using the current image or second image P2 as a reference. Accordingly, in the following description of the embodiment of the invention, second image P2 is used as the reference. However, first image P1 may be used as the reference for registering second image P2.

Referring to the flowchart of FIG. 1, search ROIs (RR11, RR12, . . . , RR21, . . . , RR31, . . . ) each of 160 pixels (L) by 160 pixels (W) are set in first image P1 such that the image is covered entirely by 11 (L) times 11 (W) (total 121) of the ROIs. On the other hand, second image P2 is set with templates ROIs (TR11, TR12, . . . , TR21, TR31, . . . ) whose central coordinates correspond with those of the search ROIs set in first image P1. The template ROIs are also set such that there are 11 (L) times 11 (W) (total 121) of them laid out in second image P2. However, the size of each template ROI is smaller than that of the search ROI at 90 pixels (L) and 90 pixels (W) (see FIG. 2).

Next, in each search ROI in first image P1, a corresponding template ROI in second image P2 is shifted to carry out template matching between the two ROIs, whereby a corresponding portion is determined in the search ROI that shows the highest degree of matching with the template ROI. For example, as shown in FIG. 3, with regard to the corresponding template ROI (TR12; see FIG. 3(1)) and search ROI (RR12; see FIG. 3(2)) having the same central coordinates, the template ROI (TR12) is moved within the search ROI (RR12) to find a corresponding portion tR12 (central coordinates (x, y)) having the highest degree of matching with the template ROI (TR12). The highest degree of matching may be determined based on the degree of correlation, for example.

Thus, it is found that the corresponding positional relationship between the template ROI (TR12) in second image P2 and the search ROI (RR12) in first image P1 is coordinates (x0, y0) and coordinates (x, y).

This corresponding positional relationship shows that the template ROI (TR12) and the search ROI (RR12) will be coaxial and have the highest degree of matching by shifting the search ROI (RR12) from the original central coordinates (x0, y0) to the central coordinates (x, y). Accordingly, the shift amount of the search ROI (RR12) can be expressed by vector as: the shift vector=(x−x0, y−y0).

Similarly, the corresponding positional relationship is determined between each template ROI(TRkl) in second image P2 and each corresponding search ROI(RRkl) in first image P1, and thereafter the shift vector of each search ROI(RRkl) is determined.

Figure 4:
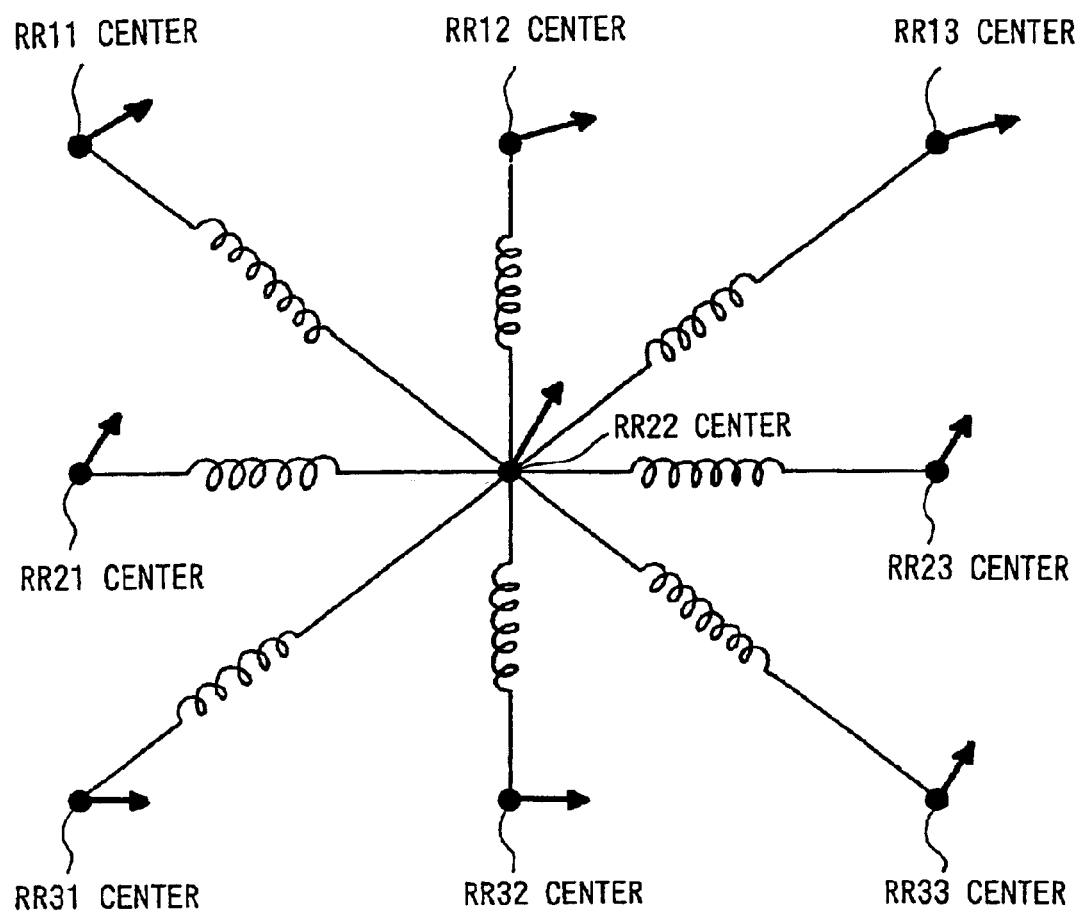
FIG. 4 shows the concept of the binding between the respective shift vectors of the surrounding search ROIs and the shift vector of the search ROI in the central region.

Thereafter, each search ROI is taken as a central region, and the shift vector of the central region is bound with the shift vectors of the respective search ROIs directly surrounding the central region by imaginary or virtual springs. Namely, as shown in FIG. 4, when a search ROI(RR22) is taken as the central region, for example, the surrounding search ROIs will comprise eight search ROIs, i.e. RR11, RR12, RR13, RR21, RR23, RR31, RR32 and RR33. The shift vectors of those search ROIs are individually bound with the shift vector of the central region, i.e. search ROI (RR22), by the springs, thereby balancing the shift vectors of the search ROIs with the respective binding forces of the springs.

More specifically, assume that the shift vector of the search ROI (RR22) as the central region is (x(2, 2), y(2, 2)), the respective shift vectors of the surrounding ROIs are (x(2+k, 2+l), y(2+k, 2+l)), and the spring constants between the shift vector of the central search ROI (RR22) and the shift vectors of the respective surrounding search ROIs are a(k, l). Then, the shift amount of the central search ROI (RR22) is corrected by Δx(2, 2) in x direction and Δy (2, 2) in y direction by the balancing of the respective spring binding forces. In other words, though the original shift vector of the central search ROI (RR22) is (x(2, 2), y(2, 2)), this is corrected by vector (Δx(2, 2), Δy(2, 2)) due to the pulling caused by the springs which depends on the difference between the original shift vector of the central search ROI and the shift vectors (x(2+k, 2+l), y(2+k, 2+l)) of the surrounding eight search ROIs. The correction amount Δx(2, 2), Δy(2, 2) can be obtained by the following equations:

$$\Delta x(2, 2) = \sum_{k,l}^{8} [a(k, 1) \times \{x(2 + k, 2 + 1) - x(2, 2)\}] \quad (1)$$

$$\Delta y(2, 2) = \sum_{k,l}^{8} [a(k, 1) \times \{y(2 + k, 2 + 1) - y(2, 2)\}] \quad (2)$$

Consequently, the shift vectors (nx(2, 2), ny(2, 2)) after the correction by the correction amounts are calculated by following equations:

$$Nx(2, 2) = x(2, 2) + b' \Delta x(2, 2) \quad (3)$$

$$Ny(2, 2) = y(2, 2) + b' \Delta y(2, 2) \quad (4)$$

where b is a constant (0<b≦1).

While the correction amount (Δx(2, 2), Δy(2, 2)) for the shift vector of the search ROI (RR22) as the central region can be expressed above, the correction amount (Δx(i, j), Δy(i, j)) for the shift vector (x(i, j), y(i, j)) of any search ROI (RRij) can be similarly given by the following equations:

$$\Delta x(i, j) = \sum_{k,l}^{8} [a(k, 1) \times \{x(i + k, j + 1) - x(i, j)\}] \quad (5)$$

$$\Delta y(i, j) = \sum_{k,l}^{8} [a(k, 1) \times \{y(i + k, j + 1) - y(i, j)\}] \quad (6)$$

It is noted that when determining the correction amount (Δx(i, j), Δy(i, j)) for each successive search ROI taken as the central region, the shift vectors of the surrounding search ROIs are not those once corrected but the shift vectors prior to the correction (x(i, j), y(i, j)

Consequently, the shift vector of each search ROI after correction by the correction amount (Δx(i, j), Δy(i, j)) can be calculated by the following equations:

$$nx(i, j) = x(i, j) + b' \Delta x(i, j) \quad (7)$$

$$ny(i, j) = y(i, j) + b' \Delta y(i, j) \quad (8)$$

It is preferable that the sum Σa(k, l) of the spring constants a(k, l) of the eight springs with regard to a single central region is standardized to unity.

While in the above embodiment the central search ROI was surrounded directly by eight search ROIs, it may be further surrounded by the sixteen search ROIs immediately outside those eight ROIs, such that the central search ROI is bound with a total of 24 search ROIs. Therefore, equations (5) and (6) can be generally expressed as:

$$\Delta x(i, j) = \sum_{k,l}^{Nc} [a(k, 1) \times \{x(i + k, j + 1) - x(i, j)\}] \quad (9)$$

$$\Delta y(i, j) = \sum_{k,l}^{8} [a(k, 1) \times \{y(i + k, j + 1) - y(i, j)\}] \quad (10)$$

where Nc is the number of the search ROIs with which the central ROI is bound.

Thus, the shift vectors can be smoothed by balancing the shift vector of each of the search ROIs with those of the surrounding search ROIs based on the pulling among the shift vectors provided by the spring binding forces. Accordingly, even if the shift vector of a particular search ROI is greatly different from the shift vectors of the surrounding search ROIs in direction or magnitude, such an anomaly can be suppressed.

Thus, the new shift vector (nx(i, j), ny(i, j)) for the center of each of the search ROIs after correction can be calculated. If a further smoothing is to be performed, the above operation for finding a new shift vector can be repeated by replacing the original shift vector (x(i, j), y(i, j)) with the new shift vector (nx(i, j), ny(i, j). The number of such repetitions may be determined based on at least one of the criteria (1) to (3) as described below, for example. As the number of repetitions increases, the number Nc of the binding search ROIs may be reduced. Those criteria are:

(1) End the repetition when the sum of the magnitudes of the new shift vectors drops below a predetermined threshold value. Namely:

$$\sum \{(n \times (i, j))^2 \times (ny (i, j))^2\} = Shift\ mag < th1$$

(2) End the repetition when the change in the sums of the magnitudes of the new shift vectors drops below a predetermined threshold th2. Namely:

Shift mag (t)–Shift mag(t−1)<th2

(3) End the repetition when the number of repetition t has reached a predetermined number th3. Namely:

t<th3

Figure 5:
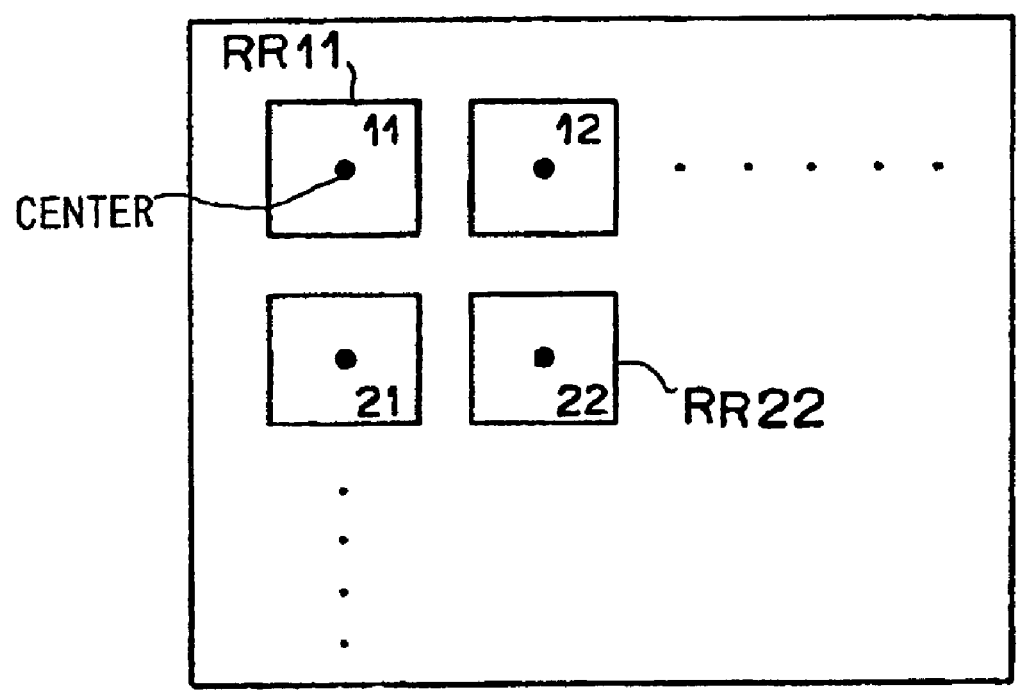
FIG. 5 shows a drawing for the explanation of the process of determining the shift vectors of the entire pixels based on the shift vector of the central pixel of each search ROI.

Thereafter, shift vectors of pixels other than the pixel at the center of the search ROI are determined. Since the central pixel of the search ROI is at the center of each of the search ROIs, as shown in FIG. 5, the shift vectors of pixels other than the central pixel of the search ROI can be determined by using the shift vector (as corrected by the above correction) of the central pixel of each of the search ROIs.

Figure 6:
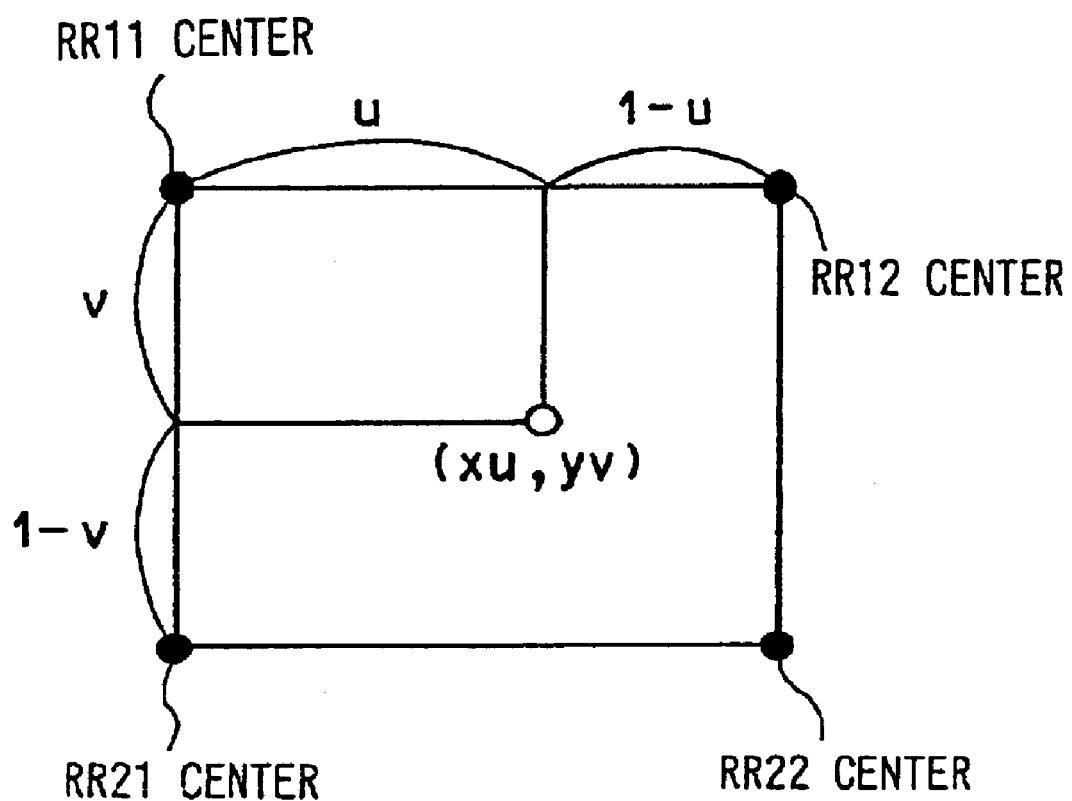
FIG. 6 shows a drawing for the explanation of a linear approximation using four neighboring pixels.

For example, FIG. 6 shows four search ROIs (RR11, RR12, RR21, RR22) and a pixel located in an area enclosed by the respective centers of the four search ROIs. The shift vector of that pixel can be determined by a linear approximation, where the distance between the neighboring search ROIs (RR11, RR12) and that between another neighboring ROIs (RR11, RR21) are each normalized to unity and where the respective central pixels of the four search ROIs (RR11, RR12, RR21, RR22) are assumed to be four nearest neighbors. Thus, the shift vector (nxu, nyv) of the pixel (xu, yv) can be calculated by the following equations:

$$nxu=(1-u)(1-v)'nx(1,1)+u(1-v)'nx(1,2)+(1-u)v'nx(2,1)+uv'nx(2,2) \quad (11)$$

$$nyu=(1-u)(1-v)'ny(1,1)+u(1-v)'ny(1,2)+(1-u)v'ny(2,1)+uv'ny(2,2) \quad (12)$$

The above linear approximation can be applied to the other it pixels to calculate the shift vectors of all the pixels in first image P1. Of the pixels constituting first image P1, the shift vectors of those pixels lying outside the area enclosed by the centers of the four search ROIs can be calculated by extrapolation. Furthermore, the calculation of the shift vectors is not limited to the linear approximation but can also be performed by other methods including secondary approximation, spline, and NURBS.

Based on the shift vectors thus obtained, the pixels in first image P1 are individually shifted and thereby transformed into image P1' which is registered in its entirely with respect to second image P2.

However, after the above registration, it is impossible to perform such inter-image calculations as subtraction processing between those two images P1' and P2. This is because of the fact that, while such processing requires calculations for each pair of corresponding pixels in images P1' and P2, the pixels in first image P1' after transformation have been shifted by the shift vectors and therefore not located at positions corresponding to the respective pixels constituting second image P2.

Accordingly, it is necessary to generate pixels constituting the transformed first image P1' that correspond with the locations of the respective pixels constituting second image P2. To do that, a first-order interpolation calculation is performed using the pixel values of the four pixels in the transformed first image P1' that are adjacent the position of each pixel constituting second image P2. This calculation enables the generation of the pixels in the transformed first image P1' that are located in positions corresponding to the respective pixels constituting second image P2, so that the inter-image calculation processing can be performed between the corresponding pixels. Consequently, such inter-image calculated images can be obtained as a subtraction image Psu (=a2'P2−a1'P1; a1, where a2 is a constant) where differences between both images P1' and P2 are extracted or enhanced.

In the case of subtraction image Psu, since the portion where there is no difference between the images P1(P1') and P2 is reproduced as a medium value (medium density, luminance or color), a constant value (a medium value mid= 512 when the image is displayed in 10 bits) is preferably added and the differential contrast adjusted.

$$Psu=(a2'P2-a1'P1) \times cont+mid \quad (13)$$

where cont and mid are constants, the former being a contrast coefficient and the latter a medium value.

Thus, in accordance with the present embodiment of the image registration method, each of the search ROIs is taken as the central region and bound with a plurality of surrounding search ROIs by spring binding forces which depend on the magnitude of the shift vector of the central search ROI and the shift vectors of the respective, surrounding search ROIs such that they pull each other. As a result, a certain state of balance is achieved between them, which enables the shift vector quantities of each central search ROI to be smoothed by the shift vectors of the surrounding search ROIs. Thereafter, the respective pixels are shifted in accordance with the thus smoothed shift vector. Thus, the shift vector shaving the smoothing effect can be determined by simple calculations and the registration accuracy can be maintained at a high level.

Furthermore, in accordance with the present embodiment, since the correction of the shift vectors of the pixels is performed based only on the shift vectors of the neighboring regions (i.e. the surrounding eight search ROIs), a correction of the shift vector of a pixel will have either no influence at all or such a small influence as to be inconsequential on the pixels located some distance away from the corrected pixel. Therefore, it is only necessary, when the shift vector of part of the pixels is corrected, to re-calculate the shift vectors within the area enclosed by the regions neighboring the corrected pixels. Thus, the time necessary for the re-calculation can be greatly cut down compared with the prior art, in which the shift vectors for the entire image had to be re-calculated.

It should be apparent to those skilled in the art that the above-described embodiment is only exemplary and not to be taken as limiting the scope of the invention. For example, the binding between the shift vector (x, y) of (the central pixel of) the central search ROI and that (xij, yij) of (the central pixel of) each of the surrounding search ROIs may be realized by means other than as described, i.e. as provided by the spring binding force proportional to the difference between both shift vectors, as long as such binding force is dependent on the shift vectors of the both regions.

Such binding force may include an elastic force which is proportional to the difference between those shift vectors in a manner similar to the spring binding force. It may also include the Coulomb's force (i.e. a gravitational force where the magnitudes of the shift vectors are virtually substituted by "electric charges" or "magnetic charges"), which is proportional to the product of the both shift vectors and inversely proportional to the square of the distance between them.

When the shift vectors are virtually substituted by magnetic charges (quantity of magnetism) and the binding force between (the central pixel of) the shift vector of the central search ROI and that of (the central pixel of) each of the surrounding search ROIs is assumed to be a magnetic force, the force (magnetic, Coulomb's force) F acting between the shift vector of the central search ROI and each of the surrounding search ROIs is given by:

$$F=K'qm'qm'/r^2$$

where qm and qm' are the respective shift vectors, and $K=\frac{1}{4}\pi\mu$ ($\mu$: the permeability of vacuum).

What is claimed is:

1. A method of registering two images to be compared, comprising the steps of:

setting a number of corresponding small regions in the two images;

determining a positional relationship between each pair of the corresponding small regions in the two images;

determining a relative shift amount for registration for each pair of the corresponding small regions on the basis of the corresponding positional relationship;

binding each and every small region taken as a central region with a plurality of small regions surrounding the central region by a binding force which depends on the shift amount for the central region and the shift amount for each of the surrounding small regions;

determining a new relative shift amount for each central region in accordance with the binding force; and relatively shifting the corresponding small regions in accordance with the new relative shift amount for each central region.

2. A method of registering two images as defined in claim 1, wherein the corresponding positional relationship between each pair of the corresponding small regions is determined by template matching between the corresponding small regions.

3. A method of registering two images as defined in claim 1 or 2, wherein the operation for determining the new shift amount is repeated by substituting the shift amount with the new relative shift amount.

4. A method of registering two images as defined in claim 3, wherein the operation for determining the new shift amount by substituting the shift amount with the new relative shift amount is repeated until the sum of the binding forces for the entire central regions drops below a predetermined value.

5. A method of registering two images as defined in claim 3, wherein the binding force is an elastic force corresponding to the difference between the shift amount for the central region and the shift amount for each of the surrounding small regions.

6. A method of registering two images as defined in claim 1 or 2, wherein the operation for determining the new shift amount by substituting the shift amount with the new relative shift amount is repeated until the sum of the binding forces for the entire central regions drops below a predetermined value.

7. A method of registering two images as defined in claim 6, wherein the binding force is an elastic force corresponding to the difference between the shift amount for the central region and the shift amount for each of the surrounding small regions.

8. A method of registering two images as defined in one of claim 1 or 2, wherein the binding force is an elastic force corresponding to the difference between the shift amount for the central region and the shift amount for each of the surrounding small regions.

9. A method of registering two images as defined in claim 8, wherein themodulus of elasticity of the elastic force is variable for each of the surrounding small regions.

10. A method of registering two images as defined in claim 1, wherein the images are temporally sequential images of the same object taken at different points in time.

11. A method of registering two images as defined in claim 1, wherein the images are radiographs for medical purposes.

* * * * *